(12) United States Patent
Gan (10) Patent No.: US 9,436,379 B2
(45) Date of Patent: Sep. 6, 2016

(54) CONTROL METHOD AND ELECTRONIC DEVICE

(71) Applicants: Lenovo (Beijing) Co. Ltd., Beijing (CN); Beijing Lenova Software Ltd., Beijing (CN)

(72) Inventor: Dayong Gan, Beijing (CN)

(73) Assignees: LENOVO (BEIJING) CO., LTD., Beijing (CN); BEIJING LENOVO SOFTWARE LTD., Beijing (CN)

( * ) Notice: Subject to any disclaimer, the term of this patent is extended or adjusted under 35 U.S.C. 154(b) by 74 days.

(21) Appl. No.: 13/628,081

(22) Filed: Sep. 27, 2012

(65) Prior Publication Data

US 2013/0076676 A1  Mar. 28, 2013

(30) Foreign Application Priority Data

Sep. 28, 2011  (CN) .......................... 2011 1 0301252

(51) Int. Cl.
  *G06F 3/041* (2006.01)
  *G06F 3/0488* (2013.01)

(52) U.S. Cl.
  CPC ........... *G06F 3/0488* (2013.01); *G06F 3/0414* (2013.01)

(58) Field of Classification Search
  CPC .......................... G06F 3/0414; G06F 3/0488
  See application file for complete search history.

(56) References Cited

U.S. PATENT DOCUMENTS

| | | | |
|---|---|---|---|
| 2004/0008191 A1 | 1/2004 | Poupyrev et al. | |
| 2006/0238494 A1 | 10/2006 | Narayanaswami et al. | |
| 2007/0242033 A1* | 10/2007 | Cradick et al. ............... | 345/156 |
| 2008/0151991 A1* | 6/2008 | Trimeche et al. ........ | 375/240.01 |
| 2008/0180399 A1* | 7/2008 | Cheng ........................... | 345/173 |
| 2010/0141605 A1* | 6/2010 | Kang .................... | G06F 1/1626 |
| | | | 345/174 |
| 2010/0146393 A1* | 6/2010 | Land et al. .................... | 715/723 |
| 2011/0193771 A1* | 8/2011 | Chronqvist ................... | 345/156 |
| 2012/0032901 A1* | 2/2012 | Kwon ........................... | 345/173 |
| 2012/0096952 A1* | 4/2012 | Amano et al. ........... | 73/862.046 |
| 2013/0044215 A1* | 2/2013 | Rothkopf et al. ............ | 348/143 |

FOREIGN PATENT DOCUMENTS

| | | |
|---|---|---|
| CN | 101320303 | 12/2008 |
| CN | 101836178 | 9/2010 |
| CN | 102089737 | 6/2011 |

OTHER PUBLICATIONS

Chinese Patent Application No. 201110301252.4, Chinese Patent Office, First Office Action issued on Apr. 3, 2015; 8 pages.

(Continued)

*Primary Examiner* — Kenneth Bukowski
(74) *Attorney, Agent, or Firm* — Peter Su; Dentons US LLP (57) ABSTRACT

Embodiments of the present invention are directed to a control method and an electronic device thereof. The control method according to the embodiment of the present invention is applied to the electronic device. The control method comprises: detecting pressure imposed on a first surface of the electronic device; obtaining first pressure parameters of a first pressure and second pressure parameters of a second pressure, when the second pressure is detected in the first surface while the first pressure is detected in the first surface; according to settings of current application, generating a control instruction based on the first and second pressure parameters; and executing the control instruction.

15 Claims, 6 Drawing Sheets

(56) References Cited

OTHER PUBLICATIONS

English Text of First Office Action for Chinese Patent Application No. 201110301252.4, Chinese Patent Office, First Office Action issued on Apr. 3, 2015; 7 pages.
English Translation of Chinese Patent Application CN101320303, published on Dec. 10, 2008; 37 pages.
English Translation of Chinese Patent Application CN 102089737, published on Jun. 8, 2011; 35 pages.
Chinese Patent Application No. 201110301252.4, Chinese Patent Office, Second Office Action issued on Nov. 13, 2015; 6 pages.
English Text Translation of Second Office Action for Chinese Patent Application No. 201110301252.4, Chinese Patent Office, Second Office Action issued on Nov. 13, 2015; 6 pages.
German Patent Application No. DE 102012109058.0, German Patent Office, Office Action issued on Oct. 1, 2015; 5 pages.
English Text Translation of German Patent Application No. DE 102012109058.0, German Patent Office, Office Action issued on Oct. 1, 2015; 2 pages.
Chinese Patent Application No. 201110301252.4, Chinese Patent Office, Third Office Action issued on Jun. 2, 2016; 8 pages.
English Text Translation of Third Office Action for Chinese Patent Application No. 201110301252.4, Chinese Patent Office, Third Office Action issued on Jun. 2, 2016; 7 pages.
English Text Translation of Chinese Patent Application No. CN 101836178, published on Sep. 15, 2010, Andreas Steinhauser; 9 pages.

* cited by examiner

CONTROL METHOD AND ELECTRONIC DEVICE

CROSS REFERENCES TO RELATED PATENT APPLICATIONS

This application claims priority under 35 U.S.C. §119(a) of Chinese Patent Application No. 201110301252.4, filed on Sep. 28, 2011, the disclosure of which is incorporated herein by reference in its entirety for all purposes.

TECHNICAL FIELD

The present invention relates to an electronic device and a control method applied to the electronic device.

BACKGROUND ART

As communication techniques develop, many kinds of portable electronic devices are widely used, for example, portable computers, tablet computers, portable cellular phones, and portable music players, etc. To facilitate the operation of a user, these portable electronic devices usually include input devices such as the keyboard (e.g., hard keyboard or virtual soft keyboard, etc.), touch screen or the like. For example, the user can implement corresponding control functions by performing actions, such as click, double click, drag and drop or the like, on the touch control area.

However, as techniques develop and the processing ability of a processor increases, the functions to be provided by the portable electronic devices for the user would continually increase. The simple touch operations mentioned above, such as click, double click, drag and drop, and keyboard input, etc. can no longer meet the increasingly diverse operation requirements of the user. In addition, when the user conducts more complex operations, such as zoom in/zoom out of image, rotation of image, flipping, it is often difficult to manipulate the target object in a way of manipulating the real object by means of existing electronic device, since these manipulations are not consistent with the usual manipulation of the user with respect to real object in practice. When the object displayed in the electronic device needs to be operated by the user, the user has to additionally obtain a specific operation control method.

SUMMARY OF THE INVENTION

An embodiment of the present invention is for providing an electronic device and a control method applied to the electronic device to solve the foregoing problem.

One embodiment of the present invention, a control method is provided that is applied to an electronic device. The control method comprises detecting pressure imposed on first surface of the electronic device; when second pressure is detected on the first surface while the first pressure is detected on the first surface, obtaining first pressure parameters of the first pressure and second pressure parameters of the second pressure; according to settings of current application, generating a control instruction based on the first and second pressure parameters; and executing the control instruction.

Another embodiment of the invention, an electronic device comprises a pressure detection unit, configured to detect pressure imposed on first surface of the electronic device; a parameter acquisition unit, configured to, when second pressure is detected on the first surface while the first pressure is detected on the first surface, obtain first pressure parameters of the first pressure and second pressure parameters of the second pressure; an instruction generation unit, configured to generate a control instruction based on the first and second pressure parameters according to settings of current application; and an instruction execution unit, configured to execute the control instruction.

By means of the solutions provided in the above-mentioned embodiments of the invention, it can meet various operational needs from the user. In addition, when the user conducts more complex operations, such as zoom in/zoom out of image, rotation of image, flipping, the user can manipulate the electronic device just as manipulating the actual objects by the solution provided in the above-mentioned embodiments of the invention, so as to manipulate the target object displayed by the electronic device, which is consistent with the user's operating practice.

BRIEF DESCRIPTION OF THE DRAWINGS

To clearly illustrate the technical solution of the embodiments of the invention, the accompanying drawings used in descriptions of the embodiments will be briefly depicted below. The accompanying drawings in the following descriptions only show the exemplary embodiments of the invention.

DETAILED DESCRIPTION

Hereinafter, the embodiments will be described by referring to the accompanying drawings. It should be noted that, throughout the drawings and written description, reference numerals will be used to refer to substantially steps and elements, and the repeated explanations for these steps and elements will be omitted.

In the following embodiments of the invention, the electronic device refers to a device, which can communicate with other devices. The particular form of the electronic device includes, but is not limited to, mobile phones, personal digital assistants, portable computers, tablet computers, game consoles, music players, or the like.

Figure 1:
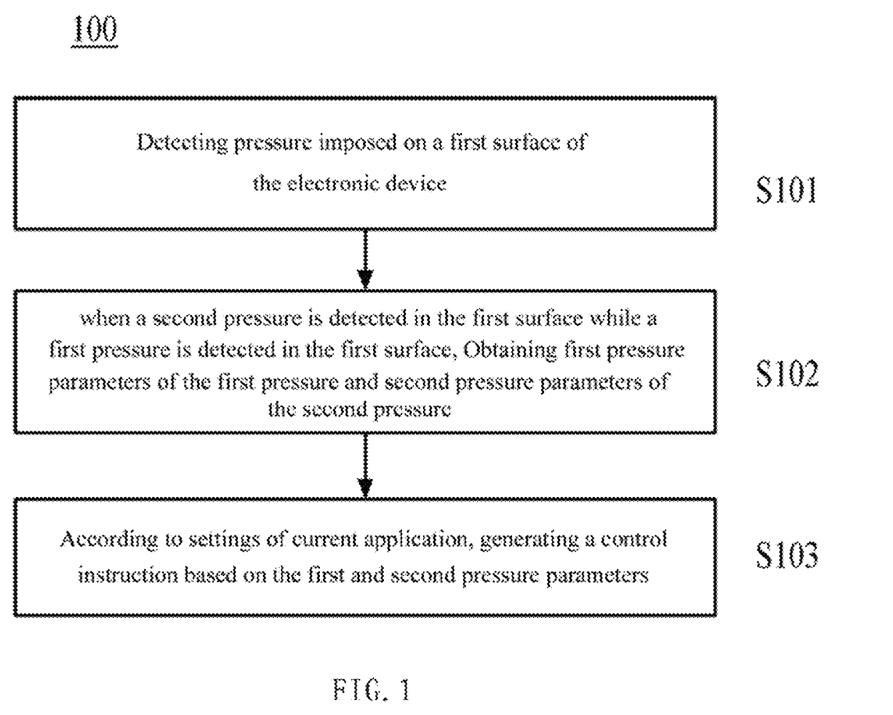
FIG. 1 is a flowchart illustrating a control method according to one embodiment of the present invention.

FIG. 1 is a flowchart illustrating a control method 100 according to one embodiment or the present invention. Hereinafter, the control method, according to the embodiment of the present invention, will be described by referring to FIG. 1. The control method 100 can be used for the above-mentioned electronic device.

As shown in FIG. 1, pressure imposed on the first surface of the electronic device is detected in step S101. The imposed pressure is for deforming the electronic device. According to one example of the embodiment of the invention, a display screen can be set on the first surface. That is, in step S101, the pressure can be detected which is imposed on the surface where the display screen of the electronic device is located.

In step S102, when a second pressure is detected in the first surface, while a first pressure is detected in the first surface, first pressure parameters of the first pressure and second pressure parameters of the second pressure are obtained. According to an example of the embodiment of the invention, the first pressure parameters may include a first press location of the first pressure and a first strength parameter of the first pressure, and the second pressure parameters may include a second press location of the second pressure and a second strength parameter of the second pressure.

Then, in step S103, according to the settings of the current application, a control instruction is generated based on the first and second pressure parameters obtained in step S102. As mentioned above, the first pressure parameters may include, for example, the first press location of the first pressure, and the first strength parameter of the first pressure. Similarly, the second pressure parameters may include, for example, the second press location of the second pressure and a second strength parameter of the second pressure. According to an example of the embodiment of the present invention, after obtaining the first pressure parameters of the first pressure and the second pressure parameters of the second pressure, a value of the strength parameter difference between the first strength parameter and the second strength parameter can be further determined. In step S103, the control instruction can be generated according to the value of the strength parameter difference between the first strength parameter and the second strength parameter and according to at least one of the first press location and the second press location.

According to an example of the embodiment of the invention, a display screen can be set on the first surface, and manipulated objects can be displayed in the display screen. The user can impose pressure on the first surface through a left hand finger and a right hand finger, respectively. As described in the above steps S102, the first press location corresponding to the first pressure imposed by the left finger and the first strength parameter of the first pressure can be obtained. Similarly, the second press location corresponding to the second pressure imposed by the right finger and the second strength parameter of the second pressure can be obtained. Then, the value of the strength parameter difference between the first strength parameter and the second strength parameter is determined. In step S103, the control instruction is generated according to the value of the strength parameter difference between the first strength parameter and the second strength parameter, and according to at least one of the first press location and the second press location.

For example, in the case where the current application is for browsing of pictures, the pictures can be displayed in the screen. When it is determined that the pressure imposed by the right finger is greater than that imposed by the left finger, according to the first strength parameter and the second strength parameter as well as the first press location and the second press location, a control command can be generated which is for indicating rotating the displayed picture toward right. In contrast, when it is determined that the pressure imposed by the left finger is greater than that imposed by the right finger, according to the first strength parameter and the second strength parameter as well as the first press location and the second press location, a control command can be generated which is for indicating rotating the displayed image toward left.

According to an example of the embodiment of the present invention, it can be further determined whether the value of the strength parameter difference between the first strength parameter and the second strength parameter is greater than the first threshold. When the value of the strength parameter difference between the first strength parameter and the second strength parameter is greater than the first threshold, a control instruction is generated according to the value of the strength parameter difference and according to at least one of the first press location and the second press location. Thereby it can prevent the user from any touch operation by mistaken on the first surface.

Alternatively, according to another example of the embodiment of the present invention, the first pressure parameters may include the first press location of the first pressure, and the second pressure parameters may include the second press location of the second pressure. In step S103, the control instruction is generated according to the first press location and the second press location.

Figure 2A:
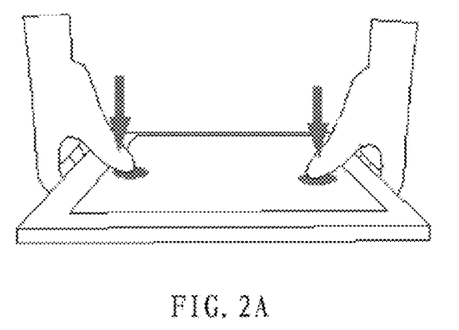
FIG. 2A and FIG. 2B are schematic diagrams showing one exemplary situation where a stress is imposed on first surface.
Figure 2B:
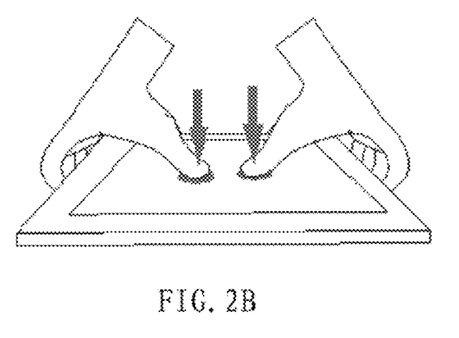

FIG. 2A and FIG. 2B are schematic diagrams showing one exemplary situation where a stress is applied to first surface. In this example, as mentioned above, a display screen can be set on the first surface, and manipulated objects can be displayed in the screen. For example, in the case where the current application is for browsing of pictures, the pictures can be displayed in the screen.

As shown in FIG. 2A and FIG. 2B, the user can impose pressure on the first surface through the left hand finger and the right hand finger, respectively. In the example shown in FIG. 2A, when the first pressure and the second pressure imposed on an area close to the left and right edges of the first surface by the left finger and the right finger of the user are detected respectively, a control command indicating to zoom in the picture(s) displayed on the screen can be generated. In contrast, in the example shown in FIG. 2B, when the first pressure and the second pressure imposed on an area close to the centre of the first surface by the left finger and the right finger of the user are detected, a control command indicating to zoom out the pictures displayed on the screen can be generated.

Figure 3A:
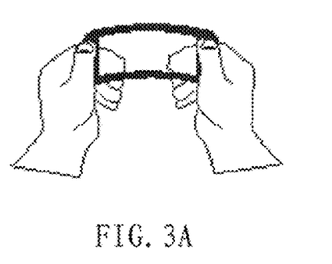
FIG. 3A and FIG. 3B are schematic diagrams showing one exemplary situation where a stress is imposed on first surface.
Figure 3B:
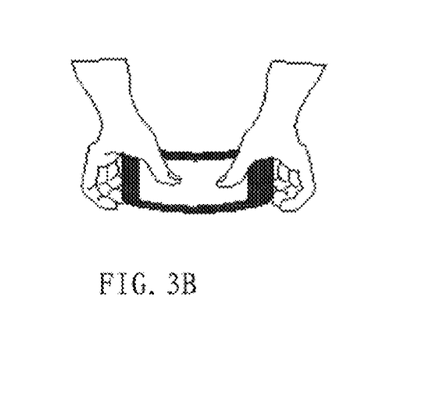

FIG. 3A and FIG. 3B are schematic diagrams showing another exemplary situation where a stress is applied to first surface. In the example shown in FIGS. 3A and 3B, the electronic device has a flexible display screen set on the first surface. For example, in the case where the current application is for browsing pictures, images can be displayed on the screen. As shown in FIG. 3A, when the user's left hand and right hand fingers impose the first pressure and the second pressure on respective area close to the left and right sides of the first surface, respectively, to cause the flexible display screen raise up toward the user in the normal direction of the first surface, a control command indicating to zoom in the picture is displayed on the screen. On the contrary, as shown in FIG. 3B, when the user's left hand and right hand fingers impose the first pressure and the second pressure on the central area of the first surface, respectively, to cause the flexible display screen sink down toward the user in the normal direction of the first surface, a control command indicating to zoom out the picture displayed on the screen can be generated. Such is similar to the effect achieved in real life, where the user imposes stress on the two sides of the picture such that the picture is raised up toward the user in its normal direction and the parts being raised seem to be zoomed in, and while the user imposes stress on the central area of the picture such that the picture is sunken down toward the user in its normal direction and the parts being sunken seem to be zoomed out. Thus compared with the existing control methods for electronic devices, the control method of the embodiment is better and consistent with the user's daily operating practice.

According to one example of the embodiment of the present invention, multiple pressure levels can be set in advance, the speed for zooming in and zooming out the object displayed in the screen can be determined according to the pressure level reached by the detected first pressure and second pressure. In addition, when the continue existence of first pressure and the second pressure is detected, the displayed object can be continuously zoomed in/out.

Finally, in step S104, the control command generated in step S103 is executed.

By the control method provided in the above-mentioned embodiment of the invention, various operational needs from the user can be met. In addition, when the user conducts more complex operations, such as zooming in/zooming out of pictures, rotation of pictures, flipping, by the control method provided in the above-mentioned embodiment of the invention, the user can manipulate the electronic device just as manipulating the actual objects, so as to manipulate the target object displayed by the electronic device, which is consistent with the user's operating practice.

Figure 4:
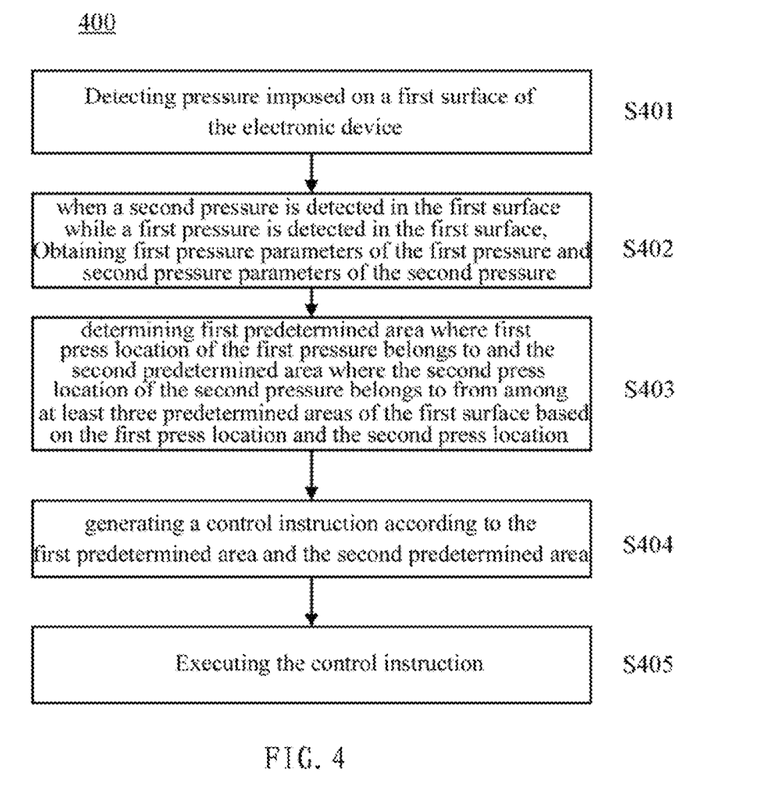
FIG. 4 is a flowchart illustrating a control method according to another embodiment of the present invention.

FIG. 4 is a flowchart illustrating a control method 400 according to another embodiment of the present invention. Hereinafter, the control method according to the embodiment of the present invention will be described by referring to FIG. 4. The control method 400 can be used for the above mentioned electronic device. In this embodiment, the first surface includes at least three predetermined areas.

Similar to the steps S101 and S102 of the control method 100 shown in FIG. 1, pressure imposed on a first surface of the electronic device is detected in step S401. A display screen can be set on the first surface according to one embodiment of the present invention. That is, in step S401, the pressure which is imposed on the surface where the display screen of the electronic device is located can be detected. In step S402, when a second pressure is detected in the first surface while a first pressure is detected in the first surface, the first pressure parameters of the first pressure and the second pressure parameters of the second pressure are obtained. In the present embodiment, the first pressure parameters may include a first press location of the first pressure, and a first strength parameter of the first pressure, and the second pressure parameters may include a second press location of the second pressure and a second strength parameter of the second pressure.

In step S403, according to the first press location of the first pressure and the second press location of the second pressure obtained in step S402, it is determined the first predetermined area where the first press location belongs to and the second predetermined area where the second press location belongs to, among the at least three predetermined areas of the first surface. According to the settings in the current application, when it is determined that the first predetermined area and the second predetermined area are different, in step S404, a control instruction is generated according to the first predetermined area and the second predetermined area. Finally, in step S405, the control instruction generated in step S404 is executed.

Figure 5:
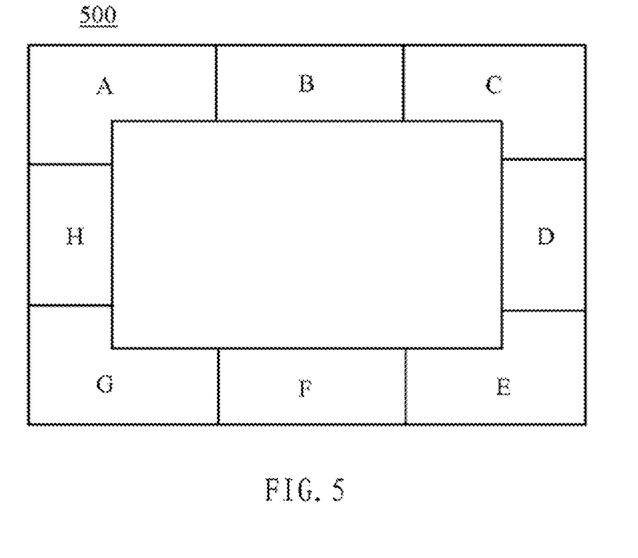
FIG. 5 is a schematic diagram showing an exemplary situation of a predetermined areas on first surface according to one embodiment of the present invention.

FIG. 5 is a schematic diagram showing an exemplary situation of predetermined areas on a first surface according to one embodiment of the present invention. As shown in FIG. 5, the first surface 500 of the electronic device is a flexible surface. A flexible screen (not shown) is set on the first surface. The first surface 500 is rectangular screen. Parts close to four sides on the first surface 500 are divided into regions A-H.

Figure 6A:
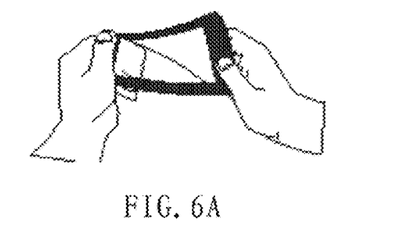
FIG. 6A and FIG. 6B are schematic diagrams showing an exemplary situation where an user imposes stress to first surface of the electronic device shown in FIG. 5.

FIG. 6A and FIG. 6B are schematic diagrams showing an exemplary situation where an user imposes stress on a first surface of the electronic device shown in FIG. 5. When the user turns up the first surface 500 as shown in FIG. 6A just as the user turns up the book pages backward, according to the control method shown in FIG. 4, the pressure which is imposed on the first surface of the electronic device is detected, and when a second pressure is detected on the first surface, while a first pressure is detected on the first surface, the first pressure parameters of the first pressure and the second pressure parameters of the second pressure are obtained. The first predetermined area where the first press location belongs to and the second predetermined area where the second press location belongs to are determined from among the predetermined areas A to H of the first surface, according to the obtained first press location of the first pressure and the second press location of the second pressure. The strength of the pressure received in various areas of the region A-H can be obtained, and the two areas A and E receiving the biggest strength will be determined as the first predetermined area where the first press location belongs to and the second predetermined area where the second press location belongs to. For example, in the case where the current application is for the e-book reading application, a control command indicating to turn over the page to the next page can be generated based on the determined areas A and E.

Figure 6B:
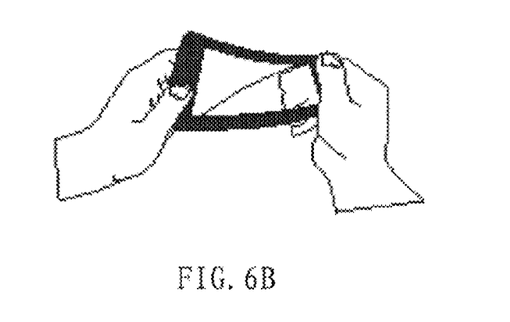

When the user turns the first surface 500, as shown in FIG. 6B, just as the user is turning the book pages forward, according to the control method shown in FIG. 4, the pressure which is imposed on the first surface of the electronic device is detected, and when the second pressure is detected in the first surface while the first pressure is detected in the first surface, the first pressure parameters of the first pressure and the second pressure parameters of the second pressure are obtained. The first predetermined area where the first press location belongs to and the second predetermined area where the second press location belongs to are determined from among the predetermined areas A to H of the first surface according to the obtained first press location of the first pressure and the second press location of the second pressure. The strength of the pressure received in various areas of the region A-H can be obtained, and the two areas C and G receiving the biggest strength will be determined as the first predetermined area, where the first press location belongs to and the second predetermined area, where the second press location belongs to. For example, in the case where the current application is the e-book reading application, a control command indicating to turn over the page to the previous page can be generated based on the determined areas C and G.

Although in the examples shown in FIG. 6A and FIG. 6B, the invention has been described with reference to the examples where the first pressure and the second pressure are imposed to the areas positioned in the two diagonals of the first surface, it is not limited thereto. For example, when the user imposes the pressure on the areas D and F, it can generate a control command for returning to the main interface of the previous stage. When the user turns over the first surface 500 along the connection line of the areas H and F, it can generate a control command to display the menu.

Moreover, while in the embodiments shown in FIG. 5, FIG. 6A, and FIG. 6B, the invention has been described with the example of the flexible screen, however, the skilled in the art will understand that an ordinary hard-screen can also be set on the first surface, and a similar partition as shown in FIG. 5 can be performed for the first surface on which the hard-screen has been set.

Through the control method provided in the above-mentioned embodiments of the invention, various operational needs from the user can be met. In addition, when the user conducts more complex operations, such as zooming in/zooming out of images, rotation of images, flipping etc., by the control method provided in the above-mentioned embodiments of the invention, the user can manipulate the electronic device just as manipulating the actual objects, so as to manipulate the target object displayed by the electronic device, which is consistent with the user's operating practice.

Moreover, according to another example of the present invention, it can be further determined whether the first strength parameter and the second strength parameter are greater than a second threshold, after obtaining the first pressure parameters of the first pressure and the second pressure parameters of the second pressure. And, when the first strength parameter and the second strength parameter are greater than the second threshold, the control instruction is generated based on the first pressure parameters and the second pressure parameters, according to the setting of current application. Thereby it can prevent the user from any touch operation by mistaken.

Figure 7:
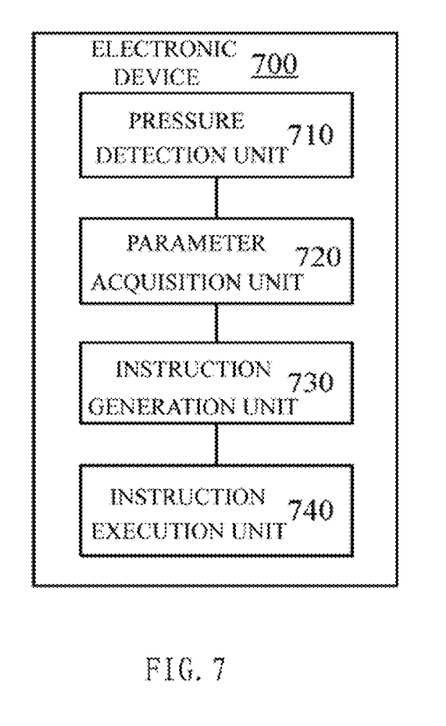
FIG. 7 is a block diagram showing an exemplary structure of an electronic device according to one embodiment of the present invention.

Hereinafter, the electronic, device of one embodiment of the invention is illustrated by referring to FIG. 7. FIG. 7 is a block diagram showing an exemplary structure of an electronic device 700 according to one embodiment of the present invention. As shown in FIG. 7, the electronic device of the present embodiment can include a pressure detection unit 710, a parameter acquisition unit 720, an instruction generation unit 730 and an instruction execution unit 740. The respective units of the electronic device 700 can perform various steps/functions of the display method in above FIG. 1. Therefore, it will not be described in detail for the sake of concision.

For example, the pressure detection unit 710 detects the pressure exerted on the first surface of the electronic device, which is for deforming the electronic device. According to one example of the invention, the display screen can be set on the first surface. That is, the pressure detection unit can detect the pressure exerted on the surface where the display screen of the electronic device is located.

When a second pressure is detected in the first surface while a first pressure is detected in the first surface, the parameter acquisition unit 720 can obtain the first pressure parameters of the first pressure and the second pressure parameters of the second pressure. According to an example of the invention, the first pressure parameters may include a first press location of the first pressure and a first strength parameter of the first pressure, and the second pressure parameters may include a second press location of the second pressure and a second strength parameter of the second pressure.

According to settings of current application, the instruction generation unit 730 can generate a control instruction based on the first and second pressure parameters obtained by the parameter acquisition unit 720. As mentioned above, the first pressure parameters may include, for example, a first press location of the first pressure and a first strength parameter of the first pressure, similarly, the second pressure parameters may include, for example, a second press location of the second pressure and a second strength parameter of the second pressure. According to one example of the present invention, the electronic device can further include a first comparison unit. After obtaining the first pressure parameters of the first pressure and the second pressure parameters of the second pressure, a value of the strength parameter difference between the first strength parameter and the second strength parameter can be determined by the first comparison unit. The instruction generation unit can generate a control instruction according to the value of the strength parameter difference and according to at least one of the first press location and the second press location.

For example, in the case where the current application is for browsing of pictures, the pictures can be displayed in the screen. When it is determined that the pressure imposed by the right finger is greater than that imposed by the left finger, according to the first strength parameter and the second strength parameter plus the first press location and the second press location, the instruction generation unit 730 can generate a control command indicating rotating the displayed picture toward the right. In contrast, when it is determined that the pressure imposed b the left finger is greater than that imposed by the right finger, according to the first strength parameter and the second strength parameter plus the first press location and the second press location, the instruction generation unit 730 can generate a control command indicating rotating the displayed picture toward the left.

According to an example of the present invention, the comparison unit can further determine whether the value of the strength parameter difference between the first strength parameter of the first pressure and the second strength parameter of the second pressure is greater than the first threshold. When the value of the strength parameter difference between the first strength parameter and the second strength parameter is greater than the first threshold, the instruction generation unit generates the control instruction according to the value of the strength parameter difference and according to the first press location and/or the second press location. Thereby, it can prevent the user from any touch operation by mistaken on the first surface.

Alternatively, according to another example of the present invention, the first pressure parameters may include the first press location of the first pressure, and the second pressure parameters may include the second press location of the second pressure. The instruction generation unit 730 generates the control instruction according to the first press location and the second press location.

According to one example of the present invention, multiple pressure levels can be set in advance, the speed for zooming in and zooming out the object displayed in the screen can be determined according to the pressure level reached by the detected first pressure and the detected second pressure. In addition, when the continue existence of first pressure and the second pressure is detected, the displayed object can be continuously zoomed in/out.

Finally, the instruction execution unit 740 executes the control instruction generated by the instruction generation unit 730.

By the electronic device provided in the above-mentioned embodiments of the invention, the various operational needs from the user can be met. In addition, when the user conducts more complex operations, such as zooming in/zooming out of images, rotation of images, flipping, the user can manipulate the electronic device in a manner of manipulating the actual objects by means of the electronic device provided in the above-mentioned embodiments of the invention, so as to manipulate the target object displayed by the electronic device, which is consistent with the user's operating practice.

Figure 8:
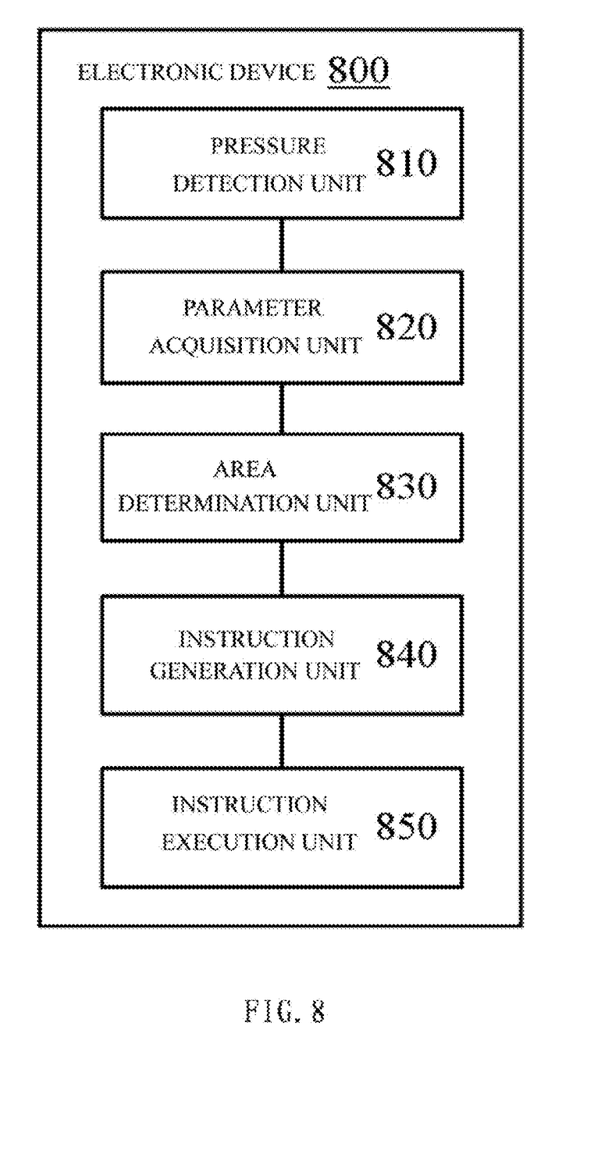
FIG. 8 is a block diagram showing an exemplary structure of an electronic device according to another embodiment of the present invention.

Hereinafter, the electronic device of another embodiment of the invention is illustrated by referring to FIG. 8. FIG. 8 is a block diagram showing an exemplary structure of an electronic device 800 according to another embodiment of the present invention. In this embodiment, the first surface includes at least three predetermined areas. As shown in FIG. 8, the electronic device 800 of the present embodiment may include a pressure detection unit 810, a parameter acquisition unit 820, an area determination unit 830, an instruction generation unit 840 and an instruction execution unit 850. Respective units of the electronic device 800 can perform various steps/functions of the display method in above FIG. 4; therefore, it will not be described in detail for the sake of concision.

For example, the pressure detection unit 810 can detect the pressure exerted on the first surface of the electronic device. According to one example of the invention, the display screen can be set on the first surface. Namely, the pressure detection unit can detect the pressure exerted on the surface where the display screen of the electronic device is located.

When a second pressure is detected in the first surface while a first pressure is detected in the first surface, the parameter acquisition unit 820 can obtain the first pressure parameters of the first pressure and the second pressure parameters of the second pressure. In the present embodiment, the first pressure parameters may include a first press location of the first pressure and a first strength parameter of the first pressure, and the second pressure parameters may include a second press location of the second pressure and a second strength parameter of the second pressure.

The area determination unit 830 can determine the first predetermined area where the first press location belongs to and the second predetermined area where the second press location belongs to, from among the at least three predetermined areas according to the first press location of the first pressure and the second press location of the second pressure obtained by the parameter acquisition unit 820. According to settings in the current application, when determining the first predetermined area and the second predetermined area are different, the instruction generation unit 840 generates a control instruction according to the first predetermined area and the second predetermined area. Finally, the instruction execution unit 850 executes the control instruction generated by the instruction generation unit 840.

By means of the electronic device provided in the above-mentioned embodiments of the invention, various operational needs from the user can be met. In addition, when the user conducts complex operations, such as zooming in/zooming out of images, rotation of images, flipping, the user can manipulate the electronic device just as manipulating the actual objects by the electronic device provided in the above-mentioned embodiments of the invention, so as to manipulate the target object displayed by the electronic device, which is consistent with the user's operating practice.

Moreover, according to another embodiment of the present invention, the electronic device of the invention can further include a second comparison unit. The second comparison unit can determine whether the first strength parameter and the second strength parameter are greater than a second threshold. And, when the first strength parameter and the second strength parameter are greater than the second threshold, the instruction generation unit can generate the control instruction based on the first pressure parameters and the second pressure parameters according to the setting of current application. Thereby it can prevent the user from any touch operation by mistaken.

The ordinary skilled in the art can realize that the units, modules, and algorithm steps of various examples described in conjunction with the embodiments disclosed by the document can be embodied in a manner of electronic hardware, computer software or a combination thereof. In order to clearly explain the interchangeability for the hardware and software, the composition and procedures of the various examples are described in general in the above description in accordance with the functions. Whether these functions are exactly executed in the way of hardware or software implementation depends on the specific application of the technical solution and the design constraint conditions. The skilled in the art can use different methods for each specific application to achieve the described functions, but such implements should not be considered beyond the scope of the invention.

While some embodiments of the present invention have been shown and described, the skilled in the art would understand various modifications can be made to these embodiments without departing from the spirit and principle of the present invention, these modifications fall into the scope for protection of the present invention.

What is claimed is:

1. A control method applied to an electronic device, the method comprising:
    detecting pressure imposed on a first surface of the electronic device, a flexible screen being set on the first surface;
    when a second pressure is detected on the first surface while a first pressure is detected on the first surface, obtaining first pressure parameters of the first pressure and second pressure parameters of the second pressure;
    generating a control instruction of manipulating a display parameter for displaying a target object on the flexible screen based on the first and second pressure parameters according to settings of a current application; and
    executing the control instruction,
    wherein,
        the electronic device is configured to deform as a whole in response to the first pressure detected on the first surface and the second pressure detected on the first surface,
        an effect of displaying the target object under the control instruction is consistent with physical deformation of the flexible screen imposed by the pressure, and
        a pair of control instructions are generated when the flexible display screen raises up and when the flexible display screen sinks down;
    wherein:
    the first pressure parameters include a first press location of the first pressure and a first strength parameter of the first pressure; and
    the second pressure parameters include a second press location of the second pressure and a second strength parameter of the second pressure;
    after obtaining the first pressure parameters of the first pressure and the second pressure parameters of the second pressure, determining a value of a strength parameter difference between the first strength parameter and the second strength parameter;
wherein the generating step of the control instruction comprises generating the control instruction according to the value of the strength parameter difference and according to at least one of the first press location and the second press location.

2. The method of claim 1, wherein the generating step of the control instruction according to the value of the strength parameter difference and according to at least one of the first press location and the second press location comprises:
when the value of the strength parameter difference is greater than a first threshold, generating the control instruction according to the value of the strength parameter difference and according to at least one of the first press location and the second press location.

3. The method of claim 1, wherein the generating step of the control instruction according to the first pressure parameters and the second pressure parameters comprises:
generating the control instruction according to the first press location and the second press location.

4. The method of claim 3, wherein the first surface comprises at least three predetermined areas, the control method further comprising:
after obtaining the first pressure parameters of the first pressure and the second pressure parameters of the second pressure, determining a first predetermined area where the first press location belongs to and a second predetermined area where the second press location belongs to from among the at least three predetermined areas;
wherein the generating step of the control instruction according to the first press location and the second press location comprises:
generating the control instruction according to the first predetermined area and the second predetermined area when the first predetermined area and the second predetermined area are different.

5. The method of claim 3, further comprising:
after obtaining the first pressure parameters of the first pressure and the second pressure parameters of the second pressure, determining whether the first strength parameter and the second strength parameter are greater than a second threshold;
wherein the generating step of the control instruction based on the first and second pressure parameters according to the settings of the current application comprises:
when the first strength parameter and the second strength parameter are greater than the second threshold, generating the control instruction based on the first pressure parameters and the second pressure parameters according to the settings of the current application.

6. The method of claim 1, further comprising:
after obtaining the first pressure parameters of the first pressure and the second pressure parameters of the second pressure, determining whether the first strength parameter and the second strength parameter are greater than a second threshold;
the generating step of the control instruction based on the first and second pressure parameters according to the settings of the current application comprises:
when the first strength parameter and the second strength parameter are greater than the second threshold, generating the control instruction based on the first pressure parameters and the second pressure parameters according to the settings of the current application.

7. The method of claim 1, wherein when the current application is for browsing pictures, the generation of the control instruction includes:
if the first and second pressure parameters indicate that a pressure imposed by a right finger is greater than that imposed by a left finger, generating the control instruction to rotate a picture displayed on the flexible screen toward right;
if the first and second pressure parameters indicate that a pressure imposed by a left finger is greater than that imposed by a right finger, generating the control instruction to rotate the picture displayed on the flexible screen toward left;
if the first and second pressure parameters indicate that the flexible screen is raised up toward a user in a normal direction of the first surface, generating the control instruction to zoom in on the picture displayed on the flexible screen; and
if the first and second pressure parameters indicate that the flexible screen to sunk down toward the user in a normal direction of the first surface, generating the control instruction to zoom out of the picture displayed on the flexible screen.

8. The method of claim 1, wherein in a case that the current application is an e-book reading application, the generation of the control instruction includes:
if the first and second pressure parameters indicate that the first pressure and the second pressure are imposed at areas positioned diagonally from each other on the first surface, generating the control instruction to turn over a page displayed on the flexible screen to a previous page or to a next page.

9. An electronic device, comprising:
a pressure detection unit, configured to detect pressure imposed on a first surface of the electronic device, a flexible screen being set on the first surface;
a parameter acquisition unit, configured to obtain first pressure parameters of a first pressure and second pressure parameters of a second pressure when the second pressure is detected on the first surface while the first pressure is detected on the first surface;
an instruction generation unit, configured to generate a control instruction of manipulating a display parameter for displaying a target object on the flexible screen based on the first and second pressure parameters according to settings of a current application; and
an instruction execution unit, configured to execute the control instruction
wherein,
the electronic device is configured to deform as a whole in response to the first pressure detected on the first surface and the second pressure detected on the first surface,
an effect of displaying the target object under the control instruction is consistent with physical deformation of the flexible screen imposed by the pressure, and
a pair of control instructions are generated when the flexible display screen raises up and when the flexible display screen sinks down;
wherein:
the first pressure parameters include a first press location of the first pressure and a first strength parameter of the first pressure; and the second pressure parameters include a second press location of the second pressure and a second strength parameter of the second pressure;

a first comparison unit, configured to determine a value of a strength parameter difference between the first strength parameter and the second strength parameter, wherein, the instruction generation unit generates the control instruction according to the value of the strength parameter difference and according to at least one of the first press location and the second press location.

10. The electronic device as claimed in claim 9, wherein when the first comparison unit determines that the value of the strength parameter difference is greater than a first threshold, the instruction generation unit generates the control instruction according to the value of the strength parameter difference and according to at least one of the first press location and the second press location.

11. The electronic device of claim 9, wherein the instruction generation unit generates the control instruction according to the first press location and the second press location.

12. The electronic device of claim 11, wherein the first surface comprises at least three predetermined areas, the electronic device further comprising:

an area determination unit, configured to determine a first predetermined area where the first press location belongs to and a second predetermined area where the second press location belongs to from among the at least three predetermined areas, wherein, the instruction generation unit generates the control instruction according to the first predetermined area and the second predetermined area when the area determination unit determines that the first predetermined area and the second predetermined area are different.

13. The electronic device of claim 9, further comprising:
a second comparison unit, configured to determine whether the first strength parameter and the second strength parameter are greater than a second threshold, wherein, when the first strength parameter and the second strength parameter are greater than the second threshold, the instruction generation unit generates the control instruction based on the first and second pressure parameters according to the settings of the current application.

14. The electronic device of claim 9, wherein, in a case that the current application is for browsing pictures, the instruction generation unit:

generates the control instruction to rotate a picture displayed on the flexible screen toward right when the first and second pressure parameters indicate that a pressure imposed by a right finger is greater than that imposed by a left finger;

generates the control instruction to rotate the picture displayed on the flexible screen toward left when the first and second pressure parameters indicate that a pressure imposed by a left finger is greater than that imposed by a right finger;

generates the control instruction to zoom in on the picture displayed on the flexible screen when the first and second pressure parameters indicate that the flexible screen is raised up toward a user in a normal direction of the first surface; and generates the control instruction to zoom out of the picture displayed on the flexible screen when the first and second pressure parameters indicate that the flexible screen is sunk down toward the user in a normal direction of the first surface.

15. The electronic device of claim 9, wherein, in a case that the current application is an e-book reading application, the instruction generation unit:

generates the control instruction to turn over a page displayed on the flexible screen to a previous page or to a next page when the first and second pressure parameters indicate that the first pressure and the second pressure are imposed at areas positioned diagonally from each other on the first surface.

* * * * *